A. BURGESS & J. G. & M. O. REHFUSS.
MACHINE FOR FOLDING LACE CURTAINS AND LIKE MATERIALS.
APPLICATION FILED APR. 21, 1911.

1,085,537.

Patented Jan. 27, 1914.
6 SHEETS—SHEET 2.

Inventors:-
Arthur Burgess
John G. Rehfuss
Martin O. Rehfuss
by their Attorneys:-

A. BURGESS & J. G. & M. O. REHFUSS.
MACHINE FOR FOLDING LACE CURTAINS AND LIKE MATERIALS.
APPLICATION FILED APR. 21, 1911.

1,085,537.

Patented Jan. 27, 1914.

A. BURGESS & J. G. & M. O. REHFUSS.
MACHINE FOR FOLDING LACE CURTAINS AND LIKE MATERIALS.
APPLICATION FILED APR. 21, 1911.

1,085,537.

Patented Jan. 27, 1914.

Witnesses:

Inventors
Arthur Burgess
John G. Rehfuss.
Martin O. Rehfuss.
by their Attorneys

United States Patent Office.

ARTHUR BURGESS, JOHN G. REHFUSS, AND MARTIN O. REHFUSS, OF PHILADELPHIA, PENNSYLVANIA.

MACHINE FOR FOLDING LACE CURTAINS AND LIKE MATERIALS.

1,085,537. Specification of Letters Patent. Patented Jan. 27, 1914.

Application filed April 21, 1911. Serial No. 622,619.

*To all whom it may concern:*

Be it known that we, ARTHUR BURGESS, a subject of the King of Great Britain and Ireland and the Isle of Man, and JOHN G. REHFUSS and MARTIN O. REHFUSS, citizens of the United States, all residing in Philadelphia, county of Philadelphia, State of Pennsylvania, have invented certain Improvements in Machines for Folding Lace Curtains and like Materials, of which the following is a specification.

The main object of our invention is to accurately and uniformly fold lace curtains and like materials. This object we attain by folding the curtains by machinery in place of the present method of folding by hand.

A further object of the invention is to provide mechanism by which the curtain can be folded both longitudinally and laterally.

A still further object of the invention is to provide means by which a lace curtain of any width or length can be properly folded to form a neat and attractive package.

Referring to the accompanying drawings: Fig. 3, is a side view of the rear end of the machine; Fig. 13, is an enlarged transverse sectional view on the line 13—13, Fig. 1.

Figures 8, 9, 10, 11, 12:
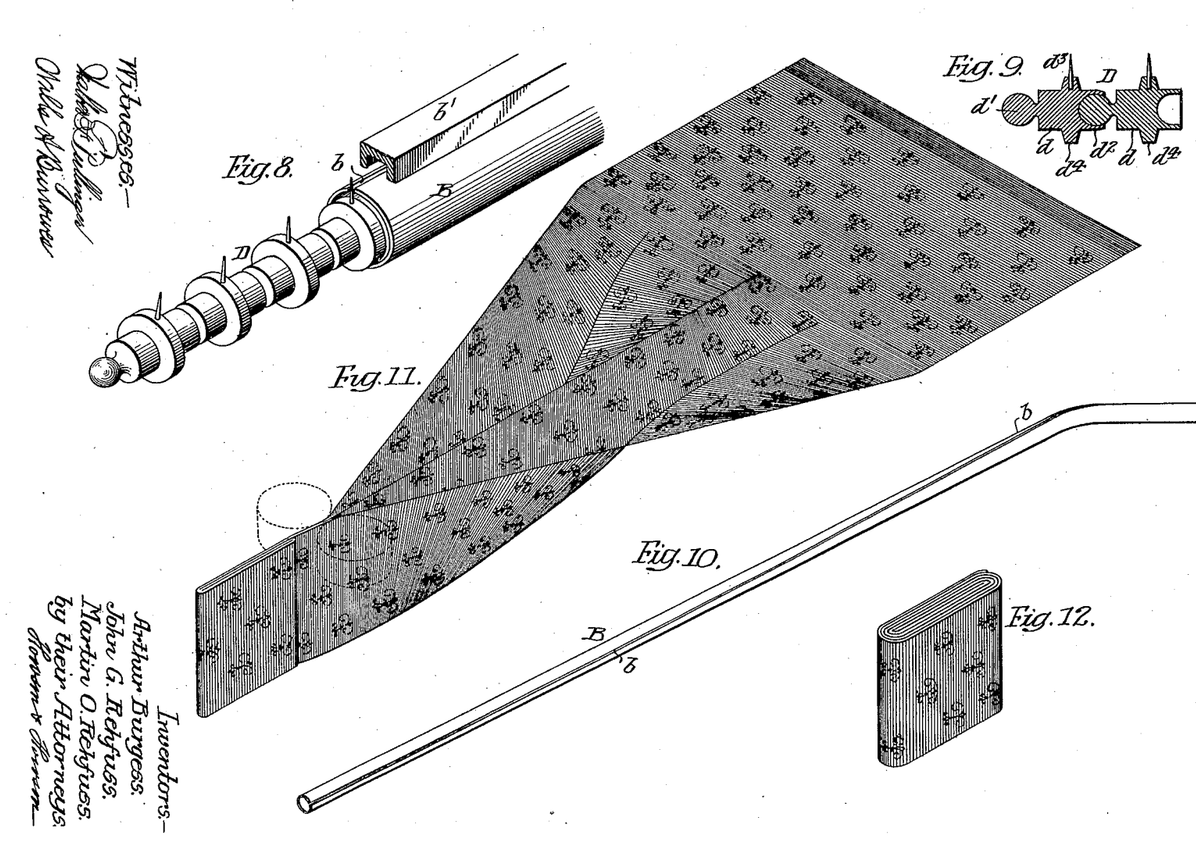
Fig. 8, is a perspective view, showing the chain tube and guard.
Fig. 9, is a sectional view of the chain.
Fig. 10, is a perspective view of one of the guide tubes.
Fig. 11, is a perspective view, showing the method of folding the curtain.
Fig. 12, is a perspective view of the folded curtain.

Referring in the first instance to Figs. 11 and 12, which illustrate the method of folding a curtain, the curtain is fed into the machine in a flat condition and, if it is of greater width than the machine, one edge is folded over a guide by hand. It is then fed through the machine; being held at the two edges and at the center and is preferably pressed at each side of the center so as to fold it longitudinally into four sections, as clearly shown in Fig. 11. The several folds are brought together and wrapped around arms, or other forms, as the curtain is fed forward so as to fold the curtain transversely to form a package, as clearly shown in Fig. 12.

Figures 1, 7:
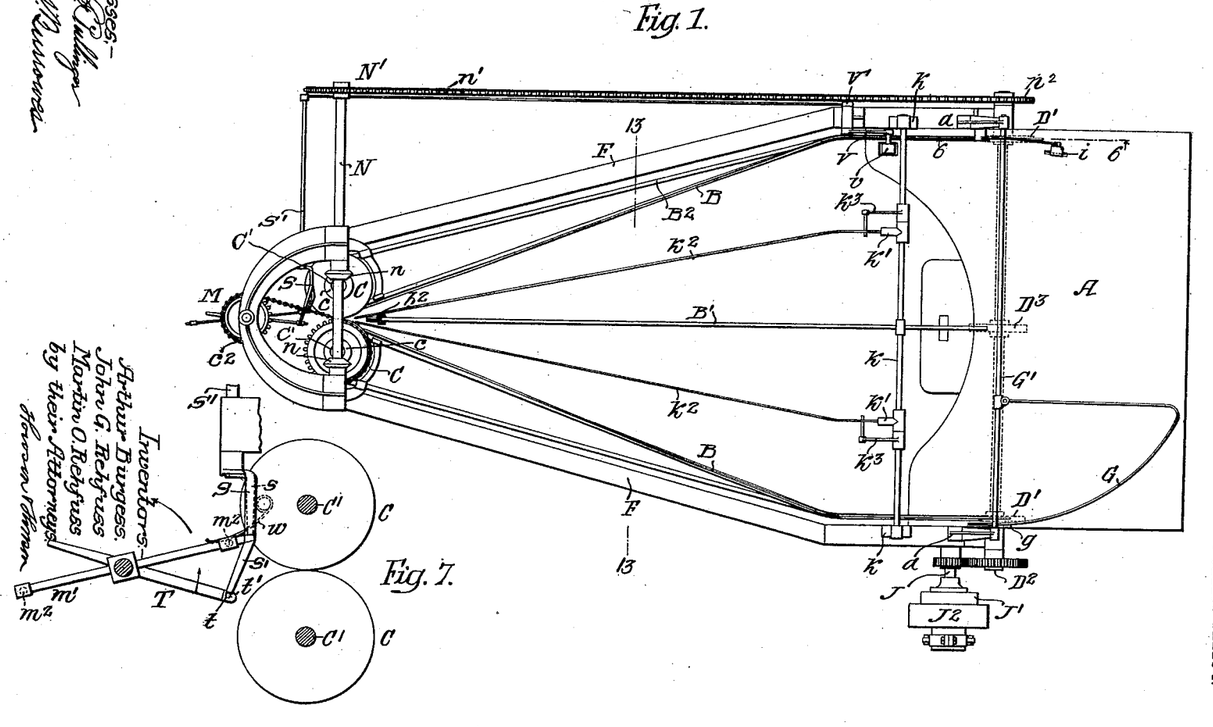
Figure 1 is a plan view of our improved machine for folding lace curtains and other fabrics.
Fig. 7, is a sectional plan view on the line 7—7, Fig. 5.

Referring now to Fig. 1, A is the feed table. B—B are the side guide tubes for the side chains and B' is the central guide tube for the central chain. These guide tubes terminate in front of a pair of rolls C—C at the rear end of the machine. Arranged to travel in the tubes B—B' are endless chains $d$ made, as clearly shown in Figs. 8 and 9. The chains, in the present instance, consist of links $d$ connected together by ball and socket joints. There is a ball $d'$ on each link adapted to a socket $d^2$ on an adjoining link and each link is free to turn independently of the other and to have a universal movement. On each link is a pin $d^3$, which extends through a slot $b$ in the tube B.

Referring particularly to Fig. 10, it will be noticed that the slot in the tube is at the upper surface of the tube near the feed table and, as the curtain is folded, it curves to one side. Pins on the chain travel in this slot; the links turning to accommodate themselves to the curve of the slot. This construction allows the curtain to be engaged by the pins when the pins are in an upright position and, as the fold is formed in the curtain, the pins are turned to the horizontal position. When the chains pass the rollers C the pins are in position to be withdrawn from the fabric without injuring it.

A channel guard $b'$ is shown in Fig. 8, and may extend over the slot in the tubes B, any distance desired, to positively hold the fabric on the pins. Each link has an annular flange $d^4$ at the center, as shown clearly in Figs. 8 and 9, and the chain is driven by sprocket wheels through the medium of this flange.

Figures 2, 6, 14:
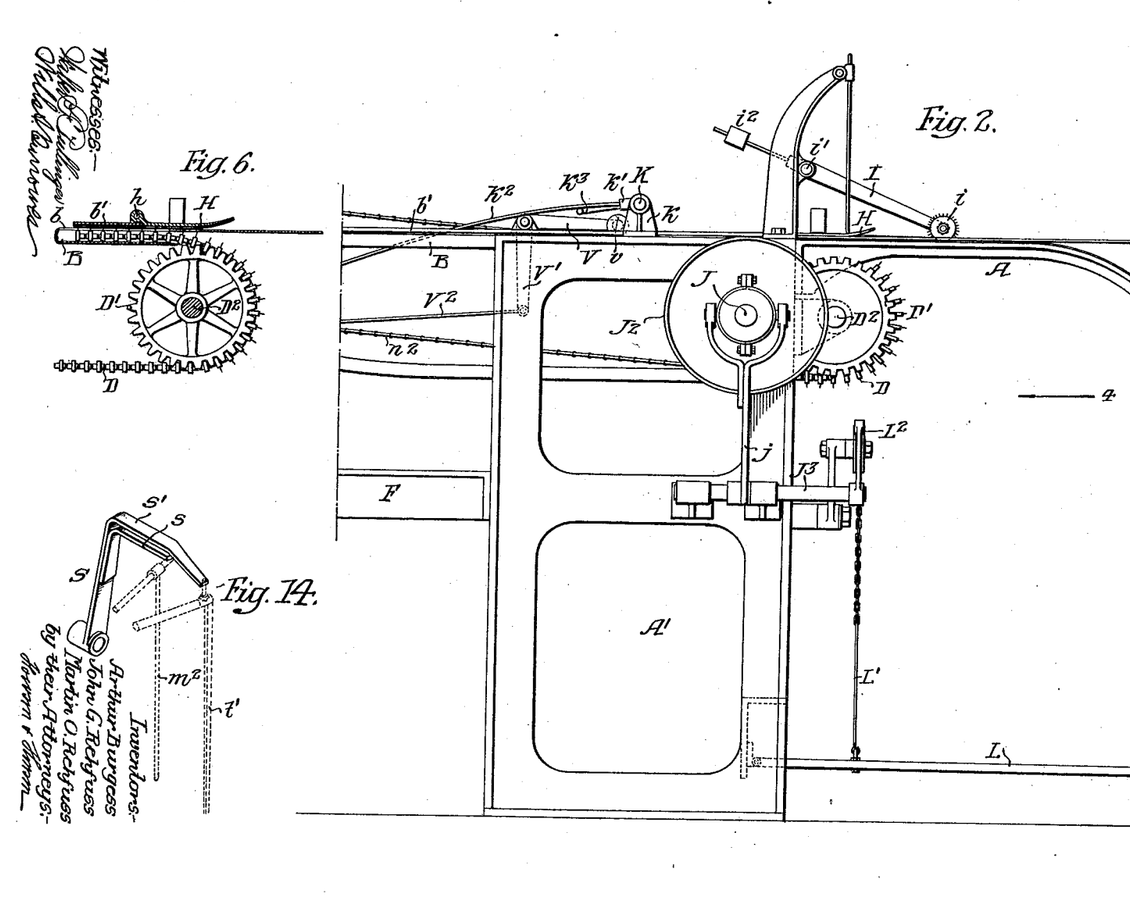
Fig. 2, is a side view of the feed end of the machine.
Fig. 6, is a sectional view on the line 6—6, Fig. 1.
Fig. 14, is a detached perspective view of the latch for retaining the mechanism for making the transverse fold; and, Fig. 15, is a sectional view on the line 15—15, Fig. 5.

Referring to Fig. 6, D' is a sprocket wheel mounted on a shaft $D^2$ and the teeth of this sprocket wheel are shaped to receive the body portion of the links, while the flanges $d^4$ enter the spaces between the teeth of the sprocket wheel so as to insure the positive driving of the chain. The shaft D², in the present instance is the driven shaft and on this shaft are two side sprocket wheels D' and a central sprocket wheel D³, which drive the three endless chains D. The side chains D travel in the grooves $c$ of the rolls C and return through the tubes B², B³, to the sprocket wheels D'. These tubes are slotted to receive the projecting pins on the links of the chains. The central chain need not be made, as shown in Figs. 8 and 9, but may be a simple chain, or belt, of any type, having pins which project through the tube and engage the fabric at the center, as this chain does not have to turn as the fabric is folded. This central chain passes around the sprocket wheel D³ on the shaft D² and around a wheel $b^2$ at the rear end of the machine carried by a bracket E' projecting from the rear supporting frame E.

The table A is mounted on a frame A', of any suitable construction, and connecting this frame with the rear supporting frame E, in the present instance, are longitudinal bars F, which are attached to the webs of the brackets E²; supporting the mechanism at the rear end of the machine.

It will be understood that the frame of the apparatus may be modified without departing from the essential features of the invention.

The table A is curved downward at the outer end so that the operator can spread the curtain over the table and it will be fed into the machine without the liability of catching on any corners or other projections. Mounted directly above the table at one side is a curved guide G consisting of a wire, in the present instance, bent into shape, as shown in Fig. 1, and mounted on a cross bar G', carried by bearings $a$, on the frame A. The end $g$, of the guide, terminates at a point at the outside of the tube B so that, if the lace curtain to be folded is of greater width than the machine, the extra portion can be turned over the guide G and the curtain will then be properly fed into the machine; the turned over edge being folded in with the other folds of the curtain.

At each side of the machine, in advance of the guards $b'$, are presser feet H, pivoted at $h$, and these presser feet extend over a certain length of the exposed feed chain as it leaves the sprocket wheel D'. When the curtain is placed in position, these presser feet H—H are turned back so as to expose the pins $d^2$. The curtain is then adjusted and the presser feet turned down. The machine being set in motion, the feeding of the curtain to the machine progresses, and, if the curtain is of greater width than the machine, it is folded over the guide G, as described above.

The curtain is adjusted on the pins of the central chain at the same time that it is adjusted on the pins of the side chains. In front of the side chains, opposite to the guide G, is an arm I, pivoted at $i'$ and having a toothed roller $i$, which rests upon the curtain as it is fed to the machine. This arm has an adjustable weight $i^2$ by which the pressure of the roller $i$ upon the fabric is regulated. This roller is set at a slight angle so as to feed the edge of the curtain to the guide chain and also to partially stretch the curtain as it is fed to the machine.

Figures 3, 13, 15:
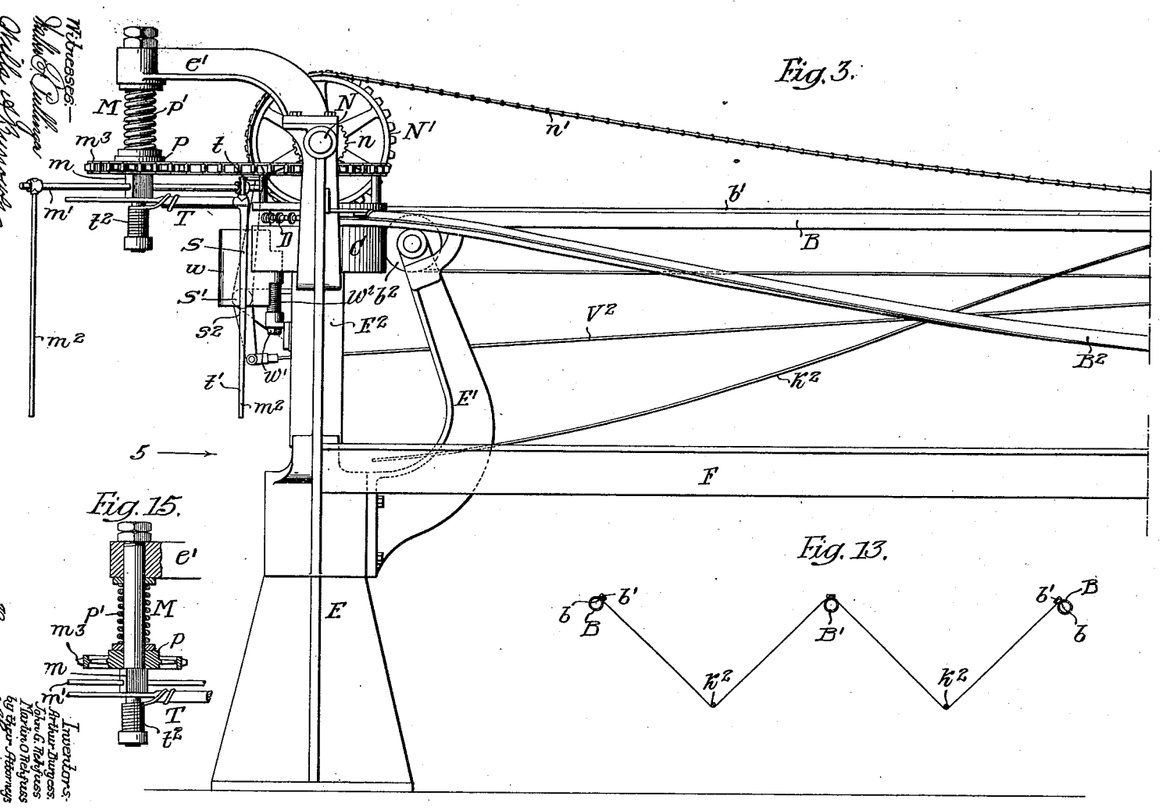
Figure 4:
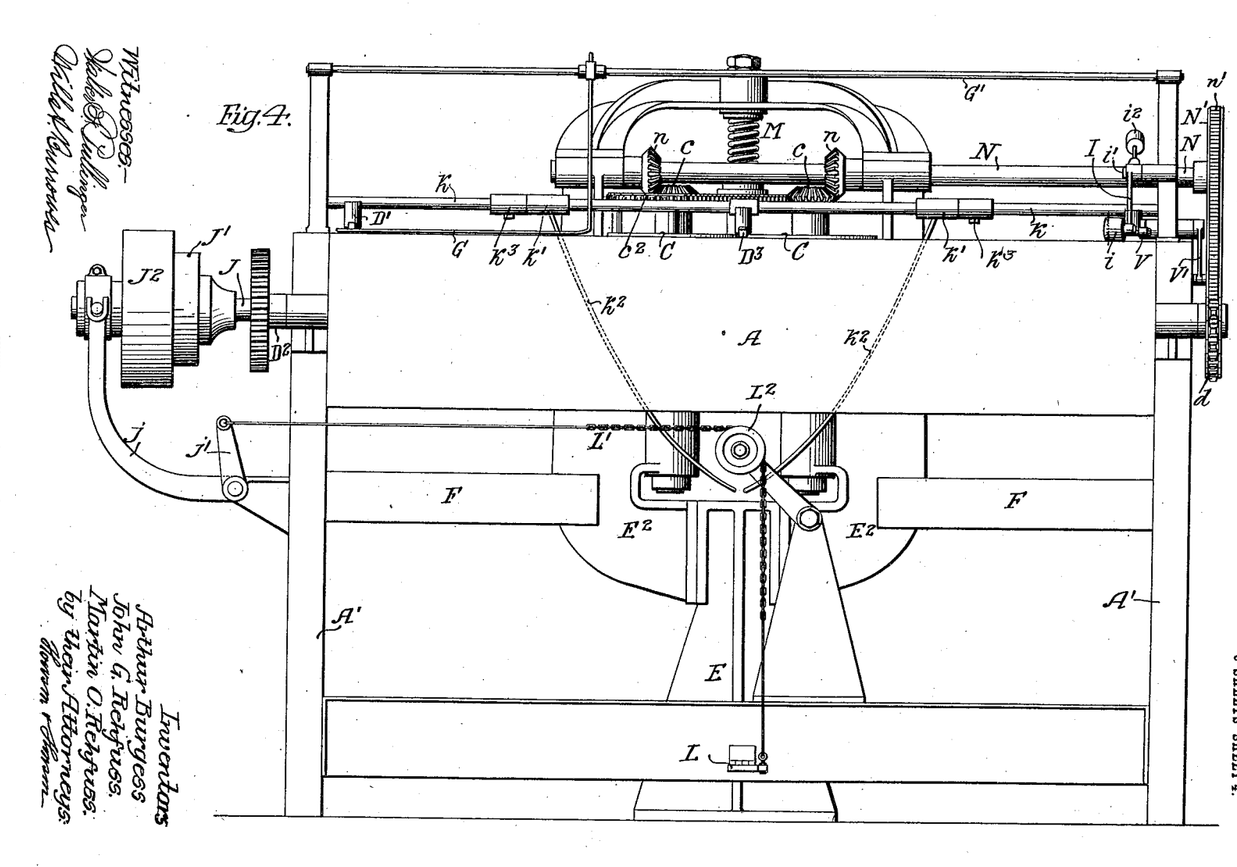
Fig. 4, is an end view, looking in the direction of the arrow 4, Fig. 2.
Figure 5:
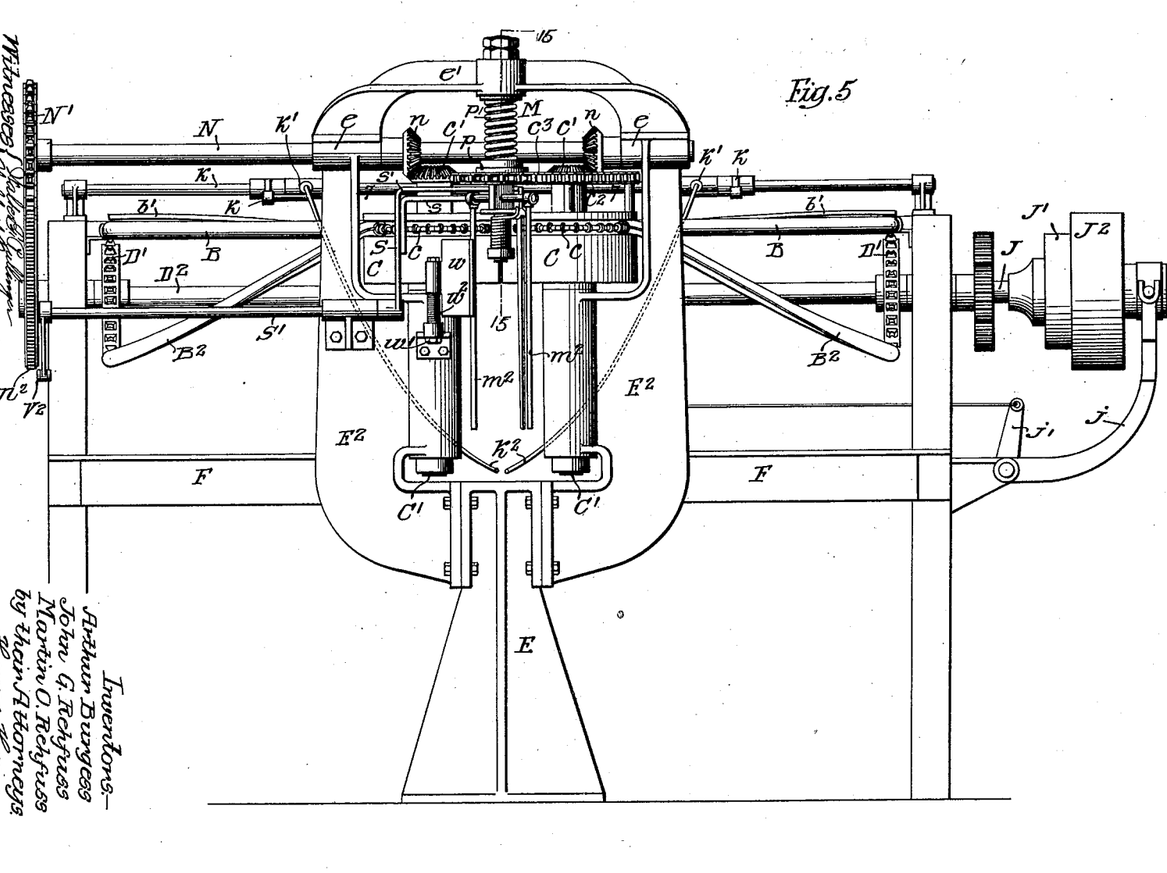
Fig. 5, is an end view, looking in the direction of the arrow 5, Fig. 3.

K is a transverse shaft adapted to bearings $k$, $k$, at each side of the machine and on this shaft are heads $k'$ carrying long presser rods $k^2$ which are bent, as clearly shown in Figs. 2 and 3, to aid in making the intermediate fold and to obliterate creases in the curtains.

$k^3$ are supporting arms, which extend under the presser rods $k^2$, in the present instance; aiding in the support of the same. The shaft D² is driven from the main driving shaft J by gearing, as clearly shown in Fig. 1 and on this shaft J is a clutch, which is arranged to clutch the said shaft to the driving belt wheel J². This clutch is operated by a lever $j$ on a shaft $j^3$, having an arm $j'$ connected to the treadle L by a rod and chain L'; the chain passing around a guide wheel L².

When the operator adjusts the curtain in position and presses his foot upon the treadle L, the mechanism will be set in motion and the curtain carried through the machine and properly folded longitudinally. After the curtain is folded, as shown in Fig. 11, it passes between the two feeding drums C, C, which are mounted on vertical shafts C', having bevel gears $c'$ at their upper ends meshing with the bevel wheels $n$ on a transverse shaft N so that they will turn in unison. The shaft N has a sprocket wheel N' at one end and passing around this sprocket wheel is a drive chain $n'$, which also passes around a sprocket wheel $n^2$ on the shaft D². The shaft N is mounted in bearings $e$ on the frame E and carried by an overhanging bearing $e'$ is a vertical shaft M having a head $m$. Mounted in this head is a cross bar $m'$ having adjustable, depending arms $m^2$, around which the curtain is wrapped after it is folded. This shaft M is driven from one of the shafts C'. On the shaft is a sprocket wheel $c^2$, around which passes a chain $c^3$, which also passes around a sprocket wheel $m^3$ on the shaft M. The sprocket wheels are so proportioned that the shaft M will rotate at the proper speed to receive the curtain as it passes from between the drums C, C. The sprocket wheel $m^3$ is loose on the shaft M and drives the shaft by friction.

$p$ is a friction disk held on to the sprocket wheel by a spring $p'$, which forces the sprocket wheel against the head $m$, as it will be understood that the sprocket wheel must turn during the entire time that the mechanism of the machine is in motion.

In order to prevent the rotation of the shaft M and its arms $m^2$, we provide a latch S mounted on a shaft S'. This latch is made as clearly shown in Fig. 14, and has two arms $s, s'$. The arm $s$ comes in contact with the pin $t$ on the bar T having a depending arm $t'$, which acts as a clamp to clamp the fabric against one of the arms $m^2$. The bar T is pivotally mounted on an extension of the shaft M and has a coiled spring $t^2$ which tends to force the bar and its arm toward the arm $m^2$; the catch S retaining the two arms out of contact until released.

In order to release the arms at a given time, we provide a presser arm V, which has a roller $v$, in the path of the curtain, and this arm is mounted on a rock shaft V'. Secured to the rock shaft is an arm $v'$, which is connected by a rod $v^2$ to a rod $s^2$ on the shaft S' so that when the curtain is first fed into the machine the end of the curtain passes under the roller $v$ of the presser arm. As this roller is connected to the latch S, it throws the latch into the path of the cross bar $m'$ and the bar T, stopping the rotation of the two members at the same time separating them, as indicated in Fig. 7,—one on one side of the space between the rollers C, C, and the other on the opposite side—so that the end of the curtain, as it is fed between the rollers, will pass between the two arms. As soon as the rear end of the curtain passes the roller $v$, the presser arm drops, actuating the catch so as to draw it away from the two bars $m'$ and T, allowing the bars to rotate; the spring $t^2$ immediately forcing the arms $t'$ against one of the arms $m^2$, clamping the end of the folded curtain to the bar $m'$. As the head $m$ is free to rotate it turns so as to wrap or transversely fold the curtains around the two arms $m^2$, as the longitudinally folded curtain passes between the rollers C, C, as indicated in diagram, Fig. 11, forming the package, as illustrated in Fig. 12. The presser arm is so set that the final transverse fold of the curtain will bring the end of the curtain even with the end of the package.

We preferably provide a yielding wiper $w$ in the path of the arms $m^2$ so as to hold the loose portion of the curtain in the position which it is being wrapped or folded. At the same time this wiper tends to smooth out the curtain as it is wrapped around the bars. The wiper, in the present instance, is mounted on a stud $w'$, secured to a bracket on one of the bearings $E^2$, and coiled on this stud is a spring $w^2$, which tends to force the wiper in the direction of the arrow, Fig. 7.

By our improved machine a lace curtain, or other fabric can be accurately folded; the machine first making a longitudinal fold and then a transverse fold; forming the lace curtain into a package, similar in size to the package usually formed by hand folding. The curtain is adjusted in position on the machine; the surplus width being turned over the guide at the table and the ends of the curtain engaged by the pins. The presser feet are then turned down and the mechanism is set in motion. The chains, with their projecting pins, carry the curtain forward and the successive pins, as the curtain moves forward, engage the curtain and hold it in proper position. As the curtain is moved forward, the side chains travel in toward the center of the machine and the curtain, between the chains, sags; forming the initial fold.

We prefer to locate presser bars between the chains so as to aid in the folding and at the same time press out any creases or kinks, which may be in the curtain. When the forward end of the curtain reaches the feed rolls C, C, these rolls also convey the curtain, as their surface speed is the same as the speed of the chains. The forward end of the curtain is projected between the arms of the transverse folding mechanism and when the rear end of the curtain reaches a given point, this mechanism is set in motion and the curtain is wrapped around the arms. As the rear end of the curtain passes around the rollers the wiper holds the end of the curtain in proper position so that the last fold will be even. The device for releasing the transverse folding mechanism is so formed that the last fold of the curtain will bring the end of the curtain at the end of the folded package.

While we have described a particular transverse fold in which the curtain is wrapped upon itself, it will be understood that we wish to cover any mechanism for folding the curtain transversely.

We have illustrated and described a particular form of chain used as the feed chain for carrying the material forward during the longitudinal folding of the curtain. This particular feed chain forms the subject of a separate application filed on the 20th day of April, 1911, Serial No. 622,361.

We claim:

1. The combination, in a machine for folding lace curtains and like material, of supports, and traversing means for engagement with the curtain at or near the edges of the same, said traversing means feeding the curtain positively forward while said edges and its center are on substantially the same plane and being arranged at an angle with respect to the center line of the machine whereby the curtain is permitted to sag and fold longitudinally on each side of its center.

2. The combination in a machine for folding lace curtains and like material, of guides at each side of the machine and arranged at an angle to the center line of the machine; and traveling pins arranged to engage each edge of the curtain and to fold it in its passage through the machine, the guides being shaped so as to turn the pins and thus release the curtain at the discharge end of the machine.

3. The combination in a machine for folding lace curtains and like material, of traveling means for folding the curtain consisting of two vertically arranged chain wheels spaced apart at the feed end of the machine and two horizontally arranged chain wheels close together at the discharge end of the machine; slotted tubes arranged at an angle and extending from the wheels at the feed end of the machine to those at the discharge end; and chains adapted to said wheels and tubes, said chains having pins extending through the slots in the tubes.

4. In a machine for folding lace curtains and like material, the combination of traveling means engaging each edge of the curtain and traveling means engaging the center of the curtain; the means engaging the edges of the curtain being arranged at an angle with respect to the means engaging the center of the curtain so that the curtain is carried to a central point while its side portions between the center and edges are permitted to sag and simultaneously fold longitudinally at each side of the center.

5. The combination in a machine for folding lace curtains and like material, of means for traveling the curtain, said means engaging the curtain at each edge and at the center; presser bars resting on the curtain between the center and side traveling means; and means for folding the curtain transversely after it has been folded longitudinally.

6. The combination in a machine for folding lace curtains and like material, of a feed table; guides extending from the feed table to the discharge end of the machine, said guides being spaced apart at the feed end and arranged close together at the discharge end; traveling pins projecting through the guides and engaging the edges of the curtain as it is fed to the machine; and means for traveling the pins whereby the curtain is folded as it is carried through the machine.

7. The combination in a machine for folding lace curtains and like material, of a traveling series of pins arranged at an angle at each side of the machine and a traveling series of pins at the center for engaging the curtain, whereby longitudinal folds are made in the curtain as it is carried through the machine.

8. The combination in a machine for folding lace curtains and like material, of a central series of traveling pins and a series of traveling pins at each side of the machine, means for directing the side series of pins toward the center series, and a pair of feed rolls receiving the curtain as it passes from the control of the pins.

9. The combination in a machine for folding lace curtains and like material, of a central series of traveling pins, a series of traveling pins at each side, guides for the side series of pins arranged at an angle in respect to the central series so that the sides of the curtain will be drawn toward the center as it is fed through the machine, presser bars for making the fold in the curtain, feed rollers between which the curtain passes as it is released from the control of the traveling pins, and means for transversely folding the curtain after it passes between the feed rollers.

10. The combination in a machine for folding lace curtains and like material, of traveling means for engaging and positively feeding the curtain, means for folding the curtain as it is fed forward, means for transversely folding the curtain after it has been folded longitudinally, and an automatic device actuated by the curtain for holding the folding means until the forward end of the curtain is in position to be engaged by the folding means.

11. The combination in means for folding lace curtains and like material, of traveling means for engaging and positively feeding the curtain, means for folding the curtain as it is fed forward, means for transversely folding the curtain after it has been folded longitudinally, an automatic device actuated by the curtain for holding the folding means until the forward end of the curtain is in position to be engaged by the folding means, and means for re-setting the mechanism for retaining the folding means in position when another curtain is introduced into the machine.

12. The combination in a machine for folding lace curtains and the like, of a table upon which the curtain is placed, traveling means for carrying the curtain as it is being folded, with a guide at one side of the table over which one edge of the curtain is folded as it is fed into the machine.

13. The combination in a machine for folding lace curtains and like material, of a table, a pair of feed rolls at the opposite end of the machine, tubular guides extending from each side of the table diagonally to the feed rolls, a spiral slot in each tube, the slot being at the upper side at the table and exposed laterally at the feed rolls, an endless chain in each tube having pins projecting through the slots so that the curtain can be placed on the pins at the table and automatically released from the pins as it passes between the rolls.

14. The combination in a machine for folding lace curtains and like material, of a table at one end of the machine, a pair of rolls at the opposite end of the machine, tubular guides extending from each side of the table diagonally toward the drums, an endless chain in each tubular guide, said guides being slotted, pins on the chain extending through the slot, a centrally located endless chain for engaging the center of the curtain, and bars located between the central chain and the side chains for forming the folds in the curtain.

15. The combination in a machine for folding lace curtains and like material, of a table at one end of the machine, a pair of vertically arranged rolls at the other end of the machine, a central endless chain having pins therein for engaging the curtain at the center, endless side chains extending diagonally from each edge of the table toward the rolls, tubes inclosing the side chains, said tubes being slotted, the slot being spiral so as to be exposed vertically at the table and laterally at the rolls, pins on the side chains extending through the slots in the guides, said pins engaging the curtain at each side and carrying it positively toward the rolls, presser bars located between the side chains and the central chain and a guide extending at one side of the table, in advance of the side chains, and extending beyond the side chains so as to allow the surplus width of the curtain to be folded over the guide, prior to the curtain being engaged by the pins of the feed chains.

16. The combination in a machine for folding lace curtains and like material, of a table at one end of the machine, a pair of vertically arranged rolls at the other end of the machine, a central endless chain, pins thereon engaging the curtain at the center, endless side chains extending diagonally from each edge of the table toward the rolls, tubes inclosing the side chains, said tubes being slotted, the slots being spiral so as to be exposed vertically at the table and laterally at the rolls, pins on the side chains extending through the slots in the guides, said pins engaging the curtain at each edge and feeding it positively toward the drums, and pivotally mounted presser feet located above the table and directly above the feed chains so that, on turning the presser feet back, the curtain can be adjusted on the pins of the feed chain.

17. The combination in a machine for folding lace curtains and like material, of a table at one end of the machine, a pair of vertically arranged rolls at the other end of the machine, a central endless chain having pins thereon for engaging the curtain at the center, endless side chains extending diagonally from each edge of the table toward the rolls, tubes inclosing the side chains, said tubes being slotted, the slot being spiral so as to be exposed vertically at the table and laterally at the rolls, pins on the side chains extending through the slots in the guides, said pins engaging the curtain at each side and feeding it positively toward the drums, a diagonally arranged pin wheel mounted above the table at one side of the machine, and an arm on which the pin wheel is pivotally mounted.

18. The combination in a machine for folding lace curtains and like material, of means for folding the curtain longitudinally, a pair of rolls between which the curtains pass after being folded longitudinally, a shaft, a head on the shaft, arms projecting from the head, with a clamping arm, a spring for forcing the clamping arm against one of the other arms so as to clamp the forward edge of the curtain, and means for frictionally driving the head so as to wrap the curtain around the arms.

19. The combination in a machine for folding lace curtains and like material, of means for folding the curtains longitudinally, arms between which the curtains pass after being folded longitudinally, a shaft, a head on the shaft, a cross bar on the head, two arms on the cross bar, a spring pressed bar having a depending arm and forming a clamp, with a latch arranged to separate the clamp bar from one of the other bars and to retain them in position, one on each side of the space through which the curtain passes, and means for automatically releasing the latch when the forward end of the curtain is projected a sufficient distance to be engaged by the clamp.

20. The combination in a machine for folding lace curtains and like material, of means for folding the curtain longitudinally, a pair of rolls between which the curtain is fed, a vertical shaft, a head on the shaft, a cross bar on the head, arms depending from the cross bar, a spring pressed arm forming, with one of the other bars, a clamp for the curtain, a latch having two arms, one arm engaging one bar and the other arm engaging the clamp bar so as to hold them apart and prevent them from rotating, means for frictionally driving the head, an arm connected to the latch and located in the path of the curtain so that when the curtain passes under the arm it will retain the latch in the locked position, and when the rear end of the curtain passes the arm it will actuate the catch and release the head carrying the wrapping arms so that the fabric will be first clamped to one of the arms and then wrapped around both arms.

21. The combination in a machine for folding lace curtains and like material, of a table at one end of the machine, a pair of vertically arranged rolls at the opposite end of the machine, side guide tubes extending from each side of the table diagonally toward the rolls, said tubes being spirally slotted, endless feed chains mounted in the tubes and having pins projecting through the slots, a central feed chain, or belt, having pins engaging the curtain at the center, presser bars located between the said chains, a cross bar having arms around which the curtain is wrapped, a clamp for engaging the forward end of the curtain as it passes between the rolls, means for frictionally driving the head, and a latch preventing the rotation of the head until the forward end of the curtain has passed between the drums.

In testimony whereof, we have signed our names to this specification, in the presence of two subscribing witnesses.

ARTHUR BURGESS.
JOHN G. REHFUSS.
MARTIN O. REHFUSS.

Witnesses:
WM. E. SHUPE,
WM. A. BARR.

Copies of this patent may be obtained for five cents each, by addressing the "Commissioner of Patents, Washington, D. C."